United States Patent
Sugaya et al.

(10) Patent No.: US 6,788,938 B1
(45) Date of Patent: Sep. 7, 2004

(54) CONSTRUCTION METHOD OF RADIO NETWORK SYSTEM AND RADIO TRANSMISSION DEVICE

(75) Inventors: Shigeru Sugaya, Kanagawa (JP); Yasunori Maeshima, Tokyo (JP); Hidemasa Yoshida, Chiba (JP)

(73) Assignee: Sony Corporation, Tokyo (JP)

( * ) Notice: Subject to any disclaimer, the term of this patent is extended or adjusted under 35 U.S.C. 154(b) by 407 days.

(21) Appl. No.: 09/744,925

(22) PCT Filed: May 31, 2000

(86) PCT No.: PCT/JP00/03509

§ 371 (c)(1), (2), (4) Date: Aug. 22, 2001

(87) PCT Pub. No.: WO00/74316

PCT Pub. Date: Dec. 7, 2000

(30) Foreign Application Priority Data

May 31, 1999 (JP) .......................................... 11/152310
Aug. 16, 1999 (JP) .......................................... 11/229870

(51) Int. Cl.[7] .......................... G06F 15/16; H04M 11/04
(52) U.S. Cl. .................. 455/435.1; 455/41.2; 455/41.3; 709/208; 370/328
(58) Field of Search ............................. 455/41.2, 41.3, 455/435.1, 3.3, 435.2; 709/208; 370/328

(56) References Cited

U.S. PATENT DOCUMENTS

| | | | | |
|---|---|---|---|---|
| 5,991,624 A | * | 11/1999 | Ishida et al. | 455/435.1 |
| 6,034,951 A | * | 3/2000 | Du | 370/328 |
| 6,246,696 B1 | * | 6/2001 | Yamaguchi et al. | 370/475 |
| 6,263,210 B1 | * | 7/2001 | Takahashi | 455/464 |

* cited by examiner

Primary Examiner—Edward F. Urban
Assistant Examiner—Huy Phan
(74) Attorney, Agent, or Firm—Jay H. Maioli (57) ABSTRACT

In order to define and validate a station in a same network easily by specifying a unique network ID in a wireless network system, by using the validation information including the unique network ID in the wireless network system, it is designed to execute, as required, a process of subscribing and connecting to an existing wireless network system in the own station, a process of building up a new wireless network system starting from the own station, a process of transmitting validation information to other station in non-registered state of network ID, as the own station subscribed to the existing wireless network system working as the control station, and a process of removing the station subscribed to the existing wireless network system from the network.

7 Claims, 11 Drawing Sheets

FIG. 11D

CONSTRUCTION METHOD OF RADIO NETWORK SYSTEM AND RADIO TRANSMISSION DEVICE

TECHNICAL FIELD

The present invention relates to a method of building up a wireless network system and wireless transmission equipment, and more particularly to a method of building up a wireless network system and wireless transmission equipment for specifying the unique network ID, and defining the wireless transmission equipment belonging to the same wireless network system.

BACKGROUND ART

Hitherto, for building up a wireless network system, especially for building up a wireless network system in a plurality of wireless networks overlapped in space, a method of building up a wireless network system by connecting only preliminarily defined wireless transmission equipment has been executed.

In this conventional method, generally, a network ID (strictly speaking, network system ID) is specified in the wireless network system to be built up, and the network ID information is fixed and set in all wireless transmission equipment for building up the wireless network system, and the wireless network system identified by each network ID is operated.

According to this method, however, the wireless network system can be built up only in the wireless transmission equipment having the same fixed network ID.

It was therefore a major hindrance when desired to extend the wireless network system by arbitrarily adding wireless transmission equipment to the wireless network system, including wireless transmission equipment having different network ID or having no network ID.

As one of the solving methods of the problem, conventionally, the network ID was set by offline operation (including physical means) in the wireless transmission equipment to be extended.

A sufficient solving method of the problem is to design a sufficient system from the beginning so that new extension of wireless transmission equipment may not be required, that is, in the wireless network system to be operated, the number of required wireless transmission equipment is preliminarily predicted from the operation records, and the maximum number of wireless transmission equipment according to the prediction is prepared in batch.

Recently, wireless transmission equipment not set in the network ID are prepared from the beginning, and a wireless network system is built up arbitrarily by using a plurality of such wireless transmission equipment.

In the prior art, however, with an intention of extension of wireless network system, it was required to set the network ID by offline operation (including physical means) in the wireless transmission equipment to be extended, or use a device for rewriting the network ID, but generally such setting work procedure was extremely complicated including the set of using the rewriting device, and accuracy was demanded in such setting operation, and it was extremely difficult for general users not familiar with such setting job to execute the setting procedure.

If the network ID is set properly by a skilled operator, in actual operation afterwards, the set network ID may be erased due to trouble of the wireless transmission equipment in the network system.

In such an event, ultimately, the general user not familiar with the setting job is demanded to set the network ID, or a device for rewriting the network ID easily is demanded.

Or, in the wireless transmission equipment not provided with the means for defining or setting the network ID from the beginning, such network ID setting method was impossible.

In the method of preparing a maximum number of wireless transmission equipment according to the prediction from the operation records in batch in the wireless network system to be managed, a much greater number of wireless transmission equipment must be prepared from the beginning as compared with the quantity required initially, and the economical problem was serious.

In the method of building up the wireless network system arbitrarily by using a plurality of wireless transmission equipment not set in the network ID from the beginning, there was a possibility of incorporation of an unwelcome wireless transmission equipment contrary to the intention of the user into the wireless network in operation. Such possibility may lead to the risk of invasion of an ill-willed third party into the wireless network system.

DISCLOSURE OF THE INVENTION

The invention is devised in the light of such problems in the conventional method of building a wireless network system, and it is hence an object thereof to present a method of building a wireless network system capable of specifying the unique network ID in the wireless network system, easily defining a wireless transmission equipment in a same network system, and validating at high reliability.

The first invention is method of building a wireless network system using wireless transmission equipment comprising a mutual connection step of mutually connecting with another station or control station by exchanging first validation information including network ID (identification information unique to a wireless network system) specified in a wireless network system, a new participation step of newly participating in a wireless network system by receiving second validation information including the network ID, a data input and output step of sending and receiving data together with management information including the network ID, and a network ID updating step of registering or erasing the network ID, further comprising:

a step of mutually connecting with the wireless transmission equipment of another station or control station registering the network ID of the existing wireless network system, by executing the mutual connection step after setting the network ID of the wireless transmission equipment of the own station in non-registration state, and a step of registering the network ID in the wireless transmission equipment of the own station by receiving the second validation information from the wireless transmission equipment of another station or control station, wherein the wireless transmission equipment of the own station is subscribed in the existing wireless network system. By doing in this manner, by the network ID unique to the corresponding wireless network system, a plurality of individually independent wireless network systems can be built up as being overlapped in space (using the same wireless network system).

The second invention is the method of building a wireless network system of claim 1, further comprising:

a step of mutually connecting with the wireless transmission equipment of another station of which network ID is in non-registration state, by executing the mutual connection step after setting the network ID of the wireless transmission equipment of the own station in non-registration state, and a step of transmitting the management information to the wireless transmission equipment of another station after newly setting the network ID of the new wireless network system as the own station becomes the control station, wherein the new wireless network system is built up, starting from the wireless transmission equipment of the own station. By doing in this manner, a new wireless network system can be easily built up by mutually connecting a plurality of wireless transmission equipment not having registered network ID, and assigning each one of the plurality of wireless transmission equipment with the same new wireless network ID. Further when extending an existing wireless network system, the wireless transmission equipment to be newly connected can automatically acquire the network ID unique to the wireless network system from the partner station of mutual connection.

The third invention is the method of building a wireless network system of claim 1 or 2, further comprising:

a step of mutually connecting with the wireless transmission equipment of another station by executing the mutual connection step, and a step of transmitting the second validation information to the wireless transmission equipment of another station from the wireless transmission equipment of the own station, wherein the own station already subscribed in the existing wireless network becomes the control station having the wireless transmission equipment, and subscribes the wireless transmission equipment of another station of which network ID is in non-registration state into the existing wireless network system. By doing in this manner, an arbitrary wireless transmission equipment in the wireless network system can be used as the control station, and the validation information can be presented.

The forth invention is the method of building a wireless network system of claim 1 or 3, further comprising:

a step of setting a reset request in the wireless transmission equipment of the own station, and a step of stopping wireless transmission of the wireless transmission equipment of the own station, wherein the wireless transmission equipment of the own station subscribed in the existing wireless network system is withdrawn from the existing wireless network system. By doing in this manner, only by deleting the network ID unique to the wireless network system being registered from the wireless transmission equipment as a constituent element of the wireless network system, the wireless transmission equipment can be automatically removed from the wireless network system. At this point, this wireless transmission equipment can be transferred to the constituent element of another wireless network system, so that the structure of the wireless network system can be designed and executed arbitrarily.

The fifth invention is a wireless transmission equipment comprising a wireless process unit, a data convert unit for converting the data with management information including network ID (identification information unique to a wireless network system) for transmitting and receiving in the wireless process unit, an external device for sending and receiving data through the data convert unit and an interface, a control unit for controlling the operation of each unit, and exchanging first validation information including the network ID used in mutual connection with the wireless transmission equipment of another station or control station, second validation information including the network ID used when subscribing to the wireless network system corresponding to the network ID, and the management information, with the data convert unit, a memory for registering the network ID by the access from the control unit, and a reset switch for storing the command for erasing the network ID from the memory, further comprising:

mutually connection means for mutually connecting with another station or control station by exchanging the first validation information, means for registering the network ID in the memory, by receiving the second validation information from another station or control station by the network ID is not registered in the own station but is registered in another station or control station, with the own station being mutually connected to another station or control station by the mutual connection means, means for transmitting the management information including the newly set network ID to the wireless transmission equipment of another station after newly setting the unique network ID in a new wireless network system, when the own station is mutually connected to another station or control station by the mutually connection means, and the network ID is not registered either in the own station or in another station or control station, means for transmitting the second validation information to the wireless transmission equipment of another station from the wireless transmission equipment of the own station when the own station is the control station, if the own station is mutually connected to another station or control station by the mutual connection means, and the network ID is registered in the own station and is not registered in another station or control station, and means of receiving the management information when the management information is transmitted from the control station, and then returning the response to the received management information to the control station, when not mutually connected to another station or control station by the mutual connection means, and the network ID is registered in the own station, and the instruction of erasing the network ID from the memory (reset request) is not set in the reset switch. By doing in this manner, by registering the network ID unique to the corresponding wireless network system in the memory of the wireless transmission equipment, the wireless transmission equipment can be used as a constituent element of individually independent wireless network systems overlapped in space (using the same wireless network system).

Or by mutually connecting a plurality of wireless transmission equipment not registering wireless network ID, and registering a same new wireless network ID in each memory of the a plurality of wireless transmission equipment, wireless transmission equipment capable of building up a new wireless network system easily can be presented By the means of registering the network ID unique to the wireless network system acquired automatically from the partner station of mutual connected, in the memory of a wireless transmission equipment to be connected newly, wireless transmission equipment capable of extending an existing wireless network system easily can be presented.

When used as arbitrary constituent elements in a wireless network system, wireless transmission equipment capable of becoming the control station for distributing validation information can be presented.

The sixth invention is the wireless transmission equipment of claim 1, further comprising:

means for erasing the network ID from the memory when not mutually connected to another station or control station by the mutual connection means, and the network ID is registered in the own station, and the reset request is set in the reset switch, and means of stopping wireless transmission of the own station. By doing in this manner, only by eliminating the network ID unique to the wireless network system being registered, from the memory of the wireless transmission equipment already set as constituent element of wireless network system, the wireless transmission equipment can be automatically removed from the wireless network system. And at this moment this wireless transmission equipment can be transferred to a constituent element of another wireless network system, so that the wireless transmission equipment capable of designing the construction of the wireless network system freely can be presented.

BEST MODE FOR CARRYING OUT THE INVENTION

Embodiments of the invention are described below while referring to the accompanying drawings.

First Embodiment

Figure 1:
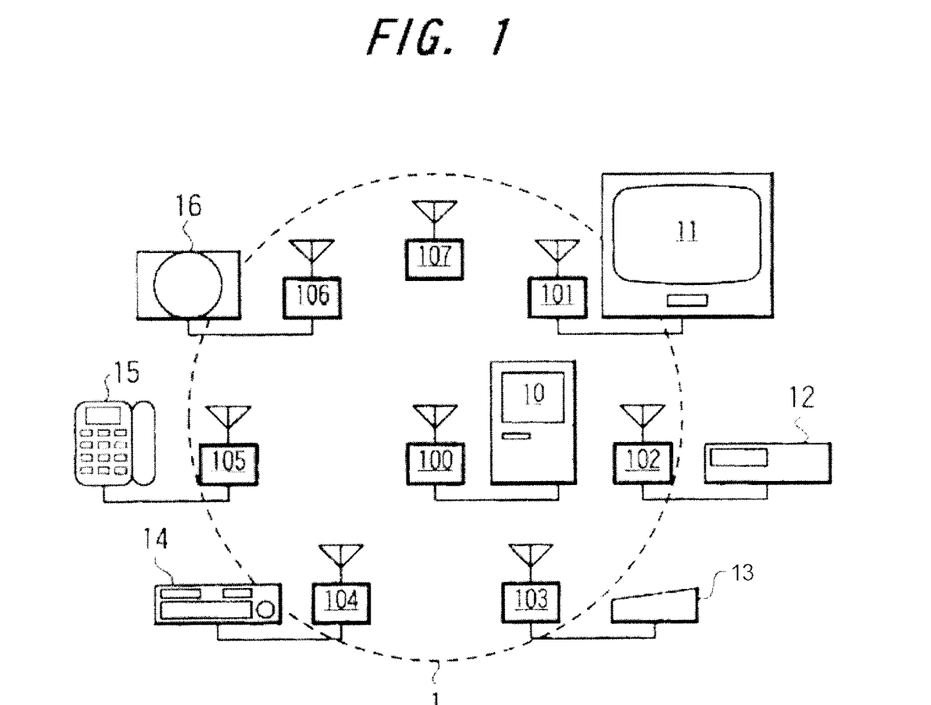
FIG. 1 is a block diagram showing an entire structure of wireless network system in an embodiment of the invention.

FIG. 1 is a block diagram showing an entire structure of a wireless network system according to the embodiment of the invention.

The wireless network system of the embodiment comprises a wireless network system 1, terminal communication stations 101 to 106 subscribed to the wireless network system 1, and input devices connected to the terminal communication stations 101 to 106 corresponding to the terminal communication stations 101 to 106.

Specific examples of the input devices may include personal computer 10, television receiver 11, set top box 12, printer output device 13, VTR 14, telephone set 15, game device 16, etc.

In this embodiment, the procedure of the terminal communication station 107 newly participating in the wireless network system is explained.

FIG. 2 is a schematic diagram showing a connection mode of the wireless network system in the embodiment of the invention.

As shown in FIG. 2, the wireless network system 1 is composed of control station 100 and terminal communication stations 101 to 106, having the control station 100 located in the center.

Figure 2A:
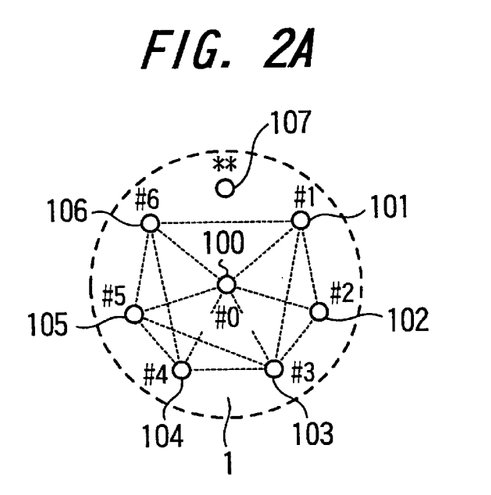
FIG. 2 is a schematic diagram showing a connection mode of wireless network system in the embodiment of the invention.

In FIG. 2(a), the control station 100 is composing one wireless network system 1, at the present, together with the terminal communication stations 101 to 106, except for terminal communication station 107.

Also as shown in FIG. 2(a), the terminal communication stations 101 to 106 cannot not mutually communicate directly with the terminal communication station located at the remotest position, but can communicate with the neighboring terminal communication stations.

FIG. 2(a) also suggests presence of terminal communication station 107 which may possibly participate newly in the wireless network system 1.

Figure 2B:
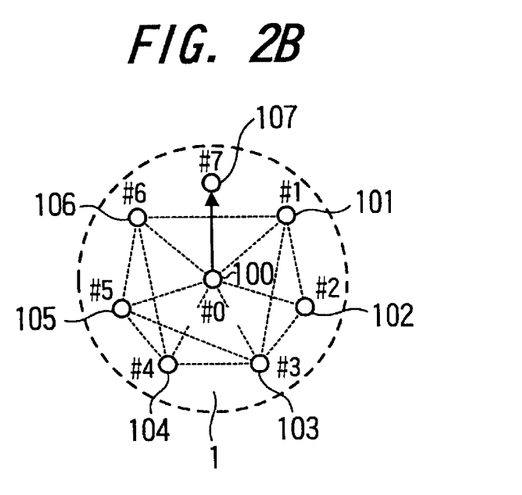

In FIG. 2(b), this terminal communication station 107 is mutually connected with the control station 100 in order to participate in the wireless network system 1, and acquires, for example, the network ID which is unique to the wireless network system 1.

Figure 2C:
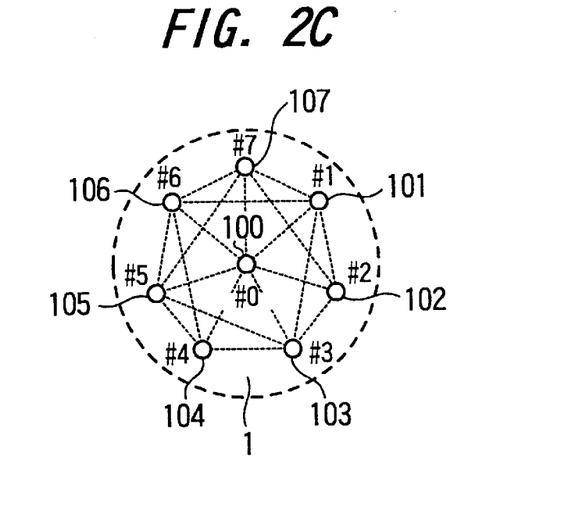

In FIG. 2(c), processing for new participation is over, and the newly participating terminal communication station 107 is one of the terminal communication stations of the wireless network system 1, and is composing an extended wireless network system 1, together with the existing terminal communication stations 101 to 106 around the control station 100

Figure 3A:
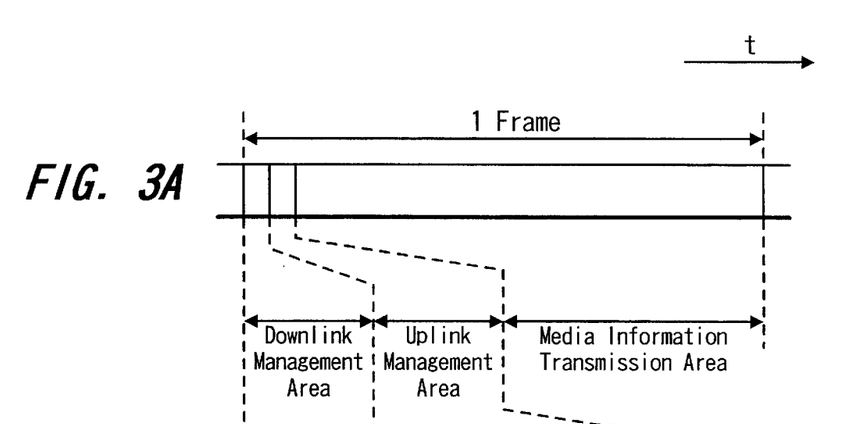
FIG. 3 an explanatory diagram showing a frame composition of signal transmitted among terminal communication stations 101 to 107 in the wireless network system in the embodiment of the invention.

FIG. 3 is an explanatory diagram showing the frame composition of the signal transmitted between the terminal communication stations 101 to 107 in the wireless network system according to the embodiment of the invention.

In this embodiment, the terminal communication stations 101 to 107 in the wireless network system 1 transmit data individually by assuming a frame period.

That is, as shown in FIG. 3, assuming one frame period in a specified period, a specified section of a front portion of one frame period is the management information transmission region, and a downlink management region and an uplink management region are set in this management information transmission region.

A section other than the management information transmission region in each frame is the media information transmission region, and in the terminal communication stations 101 to 107, various data is transmitted to this media information transmission region by receiving access control information from the control station 100.

Figure 3B:
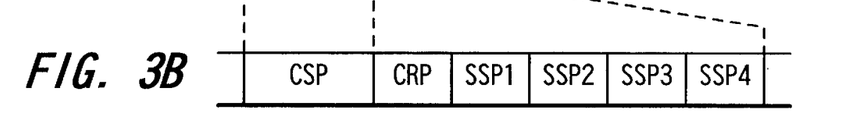

FIG. 3B shows an example of composition of downlink management region and uplink management region. A cycle start packet (CSP) is disposed in the downlink management region. A cycle report packet (SRP) and a plurality of station sync packets (SSP1 to SSP4) are disposed in the uplink management region.

The composition of the cycle start packet (CSP) in the downlink management region is described later. The cycle report packet (SRP) in the uplink management region is a packet in which the correction information of time information is disposed, being a packet for transmitting the correction information of time information to the control station from the station managing the time in the network. Station sync packets (SSP1 to SSP4) in the uplink management region are prepared as many as the number of stations (terminal communication stations), which are the packets individually assigned to the terminal communication stations. In this example, however, in a plurality of frames, packets are disposed as many as the number of terminal communication stations, and when the maximum number of terminal communication stations in the network is, for example, 16, station sync packets from all terminal communication stations in the network are transmitted in four frames. Besides, at least one station sync packet in every several frame periods is a packet assigned for new participation, and a station wishing to participate newly in the network transmits the information expressing the will to participate to the control station by using this packet. This station sync packet for new participation may be prepared by one slot each for each frame period. For example, the final slot SSP4 is used as the station sync packet for new participation.

In this embodiment, for the sake of convenience of explanation, the wireless network system is built in a frame structure, but not limited to this generally, the invention is also executed in another arbitrary wireless network system not defining such frame structure.

Figure 4:
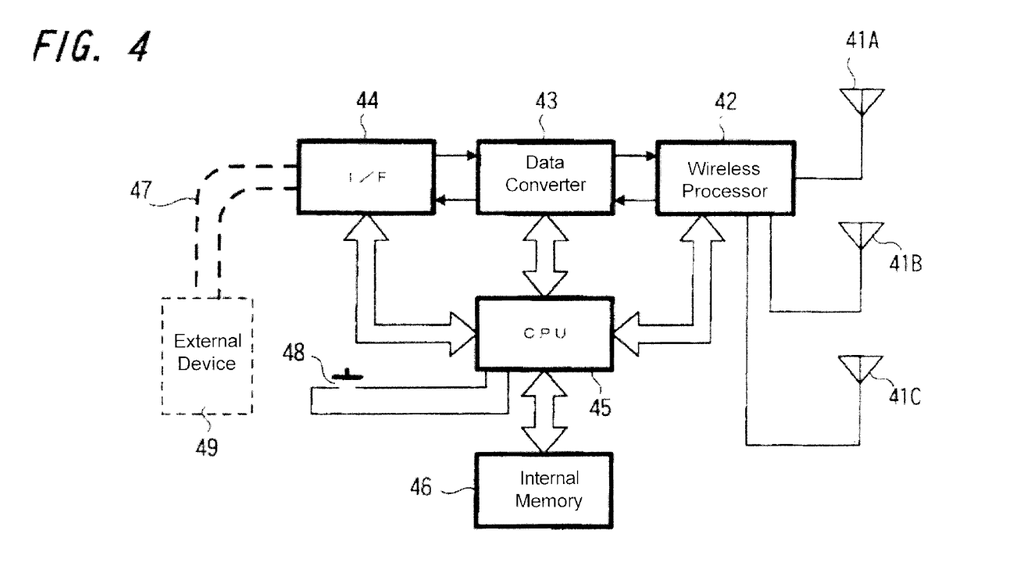
FIG. 4 is a block diagram showing the configuration of terminal communication stations 101 to 107 in the wireless network system in the embodiment of the invention.

FIG. 4 is a block diagram showing the structure of the terminal communication stations 101 to 107 in the wireless network system according to the embodiment of the invention.

In this embodiment, the terminal communication stations 101 to 107 are basically composed commonly, and include antennas 41A to 41C used in transmission and reception, and a wireless processor 42 connected to the antennas 41A to 41C for processing wireless transmission and wireless reception. In this configuration, the terminal communication stations 101 to 107 can communicate by wireless means with another wireless transmission equipment mutually.

Herein, an antenna diversity configuration is composed of a plurality of antennas, that is, antennas 41A to 41C.

This antenna diversity configuration realizes a method of communicating by changing the antennas 41A to 41C so that an optimum path (route) may be always selected, when communicating with other communication stations for composing the network system, or a method of enhancing the S/N ratio by using all of the antennas 41A to 41C, which is known as the diversity reception system.

Incidentally, as the transmission system for transmission and reception in the wireless processor 42 shown in FIG. 4, for example, the transmission system by multi-carrier signal called OFDM (orthogonal frequency division multiplex) system may be employed, and for the frequency used in transmission and reception, for example, a very high frequency band (for example, 5 GHz) may be employed.

As for transmission output, a relatively weak output is set, and when used indoors, for example, the output is set for realizing wireless transmission in a relatively short distance only, about several meters to tens of meters.

The data convert unit 43 shown in FIG. 4 converts the signal received in the wireless processor 42, and the signal transmitting from the wireless processor 42.

When receiving, the data received in the wireless processor 42 is converted in the data convert unit 43, and is supplied to the external device 49 connected externally through the interface 44 and serial bus 47. When transmitting, the data supplied from the external device 49 is supplied into the data convert unit 43 through the serial bus 47 and interface 44, and converted and sent out to the wireless processor 42.

The control unit 45 controls the operation of the parts, and exchanges data necessary for communication control with the data convert unit 43. The control unit 45 has an internal memory 45, and the internal memory 46 temporarily stores the data necessary for communication control such as network ID information and station ID information.

The control unit 45 has a reset switch 48 for deleting the recorded network ID.

The interface 44 is a constituent element responsible for external interface of the wireless transmission equipment, and assuming the external device 49 connected by way of the serial bus 47, audio and video data and various information are transmitted and received with the external device 49.

The serial bus 47 conforms to the bus specification as disclosed, for example, in IEEE1394.

As the method of connecting the wireless transmission equipment physically (electrically), alternatively, the control units 45 of the both wireless transmission equipment may be connected through the interfaces 44 of the both wireless transmission equipment by using the serial bus 47.

Or, the wireless transmission equipment may be incorporated in the main body of the external device 49 connected to the serial bus 47.

The control unit 45 for controlling the constituent elements of terminal communication stations 101 to 107 may be realized by, for example, a microcomputer.

In this case, when the signal received in the wireless processor 42 is a control signal, the received signal may be also supplied into the control unit 45 by way of the data convert unit 43, so that the control unit 45 may set the parts in the state indicated by the received control signal.

Or, as for the control signal transmitted from the control unit 45 to another transmission equipment, it may be transmitted by wireless means by supplying from the control unit 45 to the wireless processor 42 through the data convert unit 43.

When the received signal is a sync signal, the control unit 45 may judge the reception timing of the sync signal, and the frame period may be set according to the sync signal, so that the communication control processing may be executed in the determined frame period.

FIG. 5 is an explanatory diagram showing mutual connection system for exchanging the network ID in the method of building the wireless network system of the embodiment of the invention.

The external device 49 connected externally may be excluded from the scope of the wireless transmission equipment of the embodiment, and may be regarded as a device connected externally to the wireless transmission equipment.

Figure 5A:
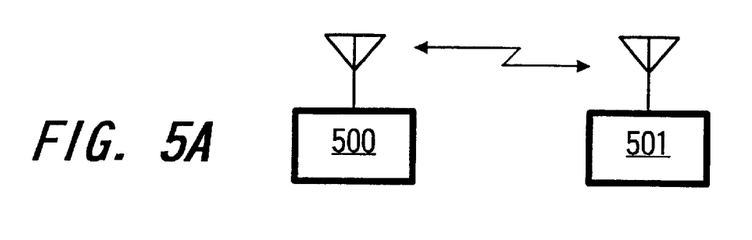
FIG. 5 is an explanatory diagram showing mutual connection system for exchanging network ID in a method of building a wireless network system in the embodiment of the invention.

FIG. 5(a) shows an example of realizing wireless connection of mutual connection system for exchanging the network ID.

In FIG. 5(a), mutual connection information is exchanged between the existing wireless transmission equipment 500 already having a registered network ID and a wireless transmission equipment 501 newly participating with the same network ID, by wireless connection.

Figure 6A:
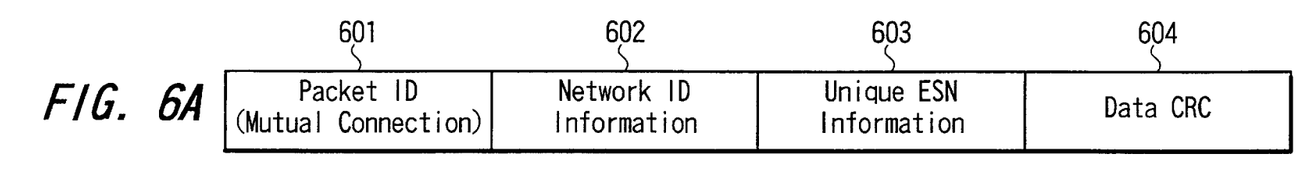
FIG. 6 is a composition diagram of data packet storing information as an example to be exchanged in mutual connection in the wireless network system in the embodiment of the invention.

This wireless connection system is started, by using an empty space of the downlink management region shown in FIG. 3, by sending a mutual connection exchange packet shown in FIG. 6(a) from the newly participating wireless transmission equipment 501 to the control station of this network system.

Figure 5B:
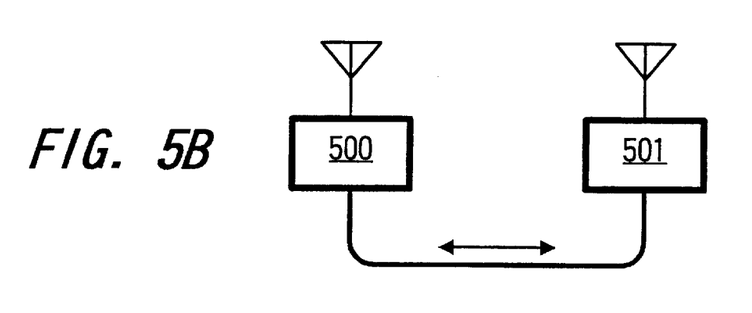

FIG. 5(b) shows an example of realizing the mutual connection system for exchanging the network ID by wired connection.

In FIG. 5(b), mutual connection information is exchanged between the existing wireless transmission equipment 500 already having a registered network ID and a wireless transmission equipment 501 newly participating with the same network ID, by wired connection.

This wireless connection system is started, by using an empty space of the downlink management region shown in FIG. 3, by sending a mutual connection exchange packet shown in FIG. 6(a) from the newly participating wireless transmission equipment 501 to the control station of this network system.

FIG. 6 is a block diagram of data packet storing information as an example of exchange at the time of mutual connection in the wireless network system of the embodiment of the invention.

Figure 6B:
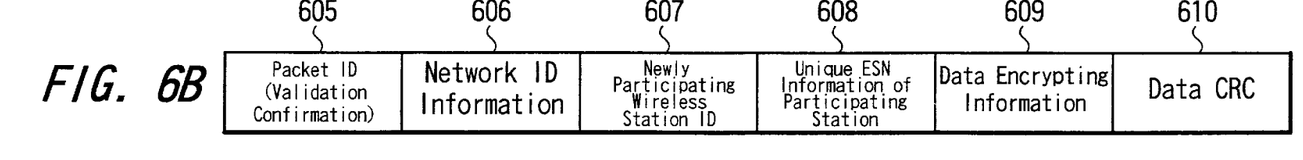

FIG. 6(a) shows an example of information of mutual connection exchange packet to be exchanged at the time of mutual connection, and FIG. 6(b) shows an example of information on validation confirm packet to be sent out from the control station side of the network system to the newly participating side at the time of mutual connection.

The example of information in FIG. 6(a) includes packet ID (mutual connection information) 601 showing the data packet is a mutual connection exchange packet, a network ID 602 unique to the wireless network system used for identifying the wireless network system as the object of connection of the wireless transmission equipment, a unique ESN information 603 which is an electronic serial number unique to the newly participating wireless transmission equipment, and data CRC 604 which is CRC (cyclic redundancy check) data used in detection of presence or absence of data error when the mutual connection exchange packet is transmitted.

As for network ID 602, if the network ID is not assigned to its terminal station, a specific fixed value is used (for example, the value assuming all bits to be 0 data). As for the unique ESN information 603, an absolute identification number (for example, 64-bit number) assigned preliminarily to each wireless transmission equipment is used.

By mutually sending and receiving the mutual connection exchange packet, the wireless transmission equipment not having registered network ID is checked.

That is, In the wireless transmission equipment not having registered network ID, for example, 0X0000 is assigned as the network ID, and when building up a wireless network system in this case, a numerical value other than 0X0000 is assigned to the network ID for the wireless transmission equipment subscribed to the wireless network system.

FIG. 6(b) shows an example of information of validation confirm packet to be sent out from the control station side of the network system to the newly participating side at the time of mutual connection, and this example of information includes packet ID (validation confirmation) 605 showing the data packet is a validation confirm packet at the time of mutual connection, a network ID 606 used for identifying the wireless network system in which the wireless transmission equipment is to participate, a station ID 607 which is the unique information given to the wireless transmission equipment participating in the wireless network system, a unique ESN information 608 which is unique to the participating station necessary for identifying the newly participating wireless transmission equipment, data encrypting information 609 used when encrypting the information of wireless transmission after participation as required, and data CRC 610 which is CRC (cyclic redundancy check) data used in detection of presence or absence of error in the data at the time of transmission.

The station ID 607 is the ID provided, for example, by up to 63 pieces at each station in the network.

Aside from the above examples of information, other information may be transmitted and received as required.

If an error is detected in the CRC data, it may be designed to judge the corresponding exchange information to be invalid.

Figure 7:
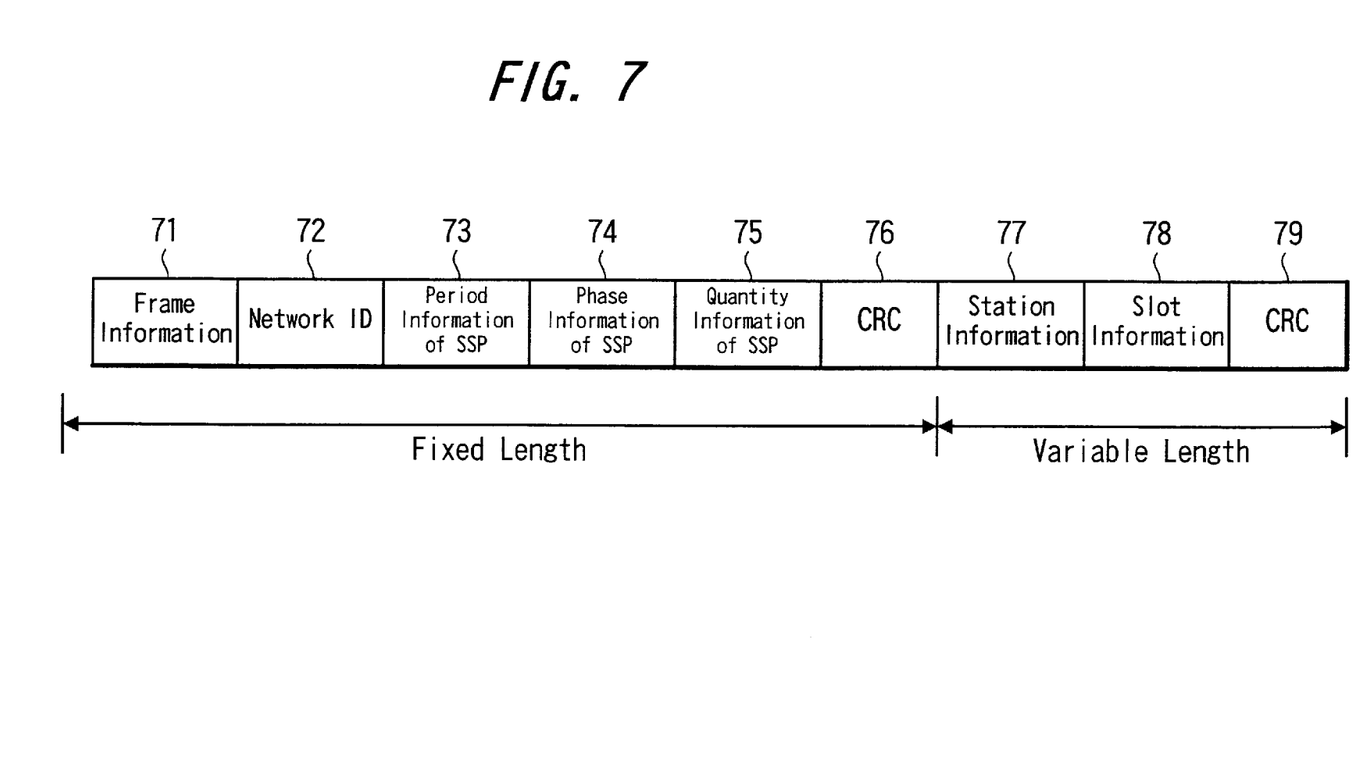
FIG. 7 is a composition diagram of data packet storing downlink management information as an example to be exchanged in mutual connection in the wireless network system in the embodiment of the invention.

FIG. 7 shows a composition of data packet storing a cycle start packet (CSP) as downlink management information as an example of exchange at the time of mutual connected in the wireless network system according to the embodiment of the invention.

As the downlink management information, for example, the packet composition shown in FIG. 7 is preferably used.

The downlink management information shown in FIG. 7 includes frame information 71 showing the frame number given in each frame, network ID 72 which is an identification number unique to the pertinent wireless network system, period information 73 of station sync packet (SSP), phase information 74 of station sync packet (SSP), quantity information 75 of station sync packet (SSP), CRC data 76, station information 77, slot information 78, and CRC data 79. The CRC data 76 is the data given to the data from the frame information 71 to the quantity information 75 of SSP, and the length is fixed up to this CRC data 76. The CRC data 79 is the data given to the station information 77 and slot information 78, and the length is variable from the station information 77 to the CRC data 79. The station information 77 shows the information by the number of station sync packets (SSP) in one frame, and how many frames are used for composing the SSP of one cycle. The phase information 74 of the SSP shows the present frame is the frame of which position in one cycle.

The slot information 78 may be designed to transmit, for example, the enable station ID expressing the communication station in operation for composing this wireless network system, the network station link map showing the mutual connection status of communication stations for composing the wireless network system, network information used in mutual validation in this wireless network system, frame use information showing the status of use of the corresponding transmission line or band assignment status in the frame, and other various management information necessary for management of the wireless network system.

In the downlink management information, moreover, other information may be also transmitted and received as required. For example, it may include the information used for encrypting information communication between communication stations within the same network system.

Figure 8:
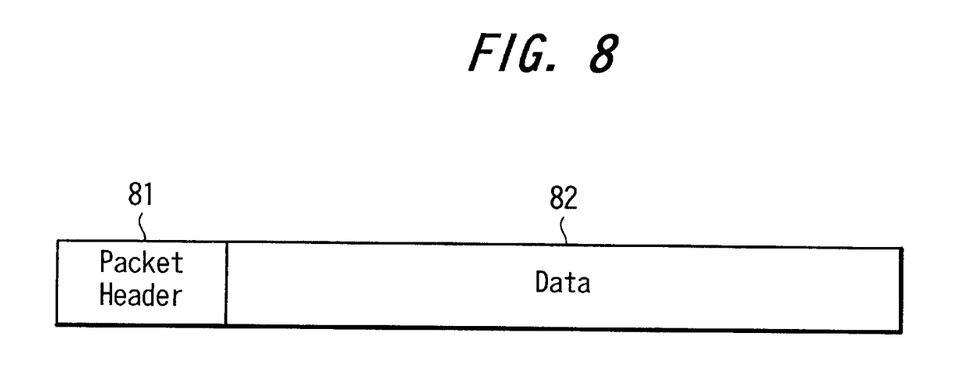
FIG. 8 is composition diagram of data packet storing wireless packet data as an example of transmission and reception in the wireless network system in the embodiment of the invention.

FIG. 8 shows the composition of data packet storing silent packet data as an example of transmission and reception in the wireless network system according to the embodiment of the invention.

In the data packet shown in FIG. 8 (in the media information transmission area of FIG. 3A), only the data portion 82 excluding the header portion 81 is encrypted. By this encrypting process, it is intended to prevent leak of information to other wireless transmission equipment being not an official member of this network system.

Figure 9:
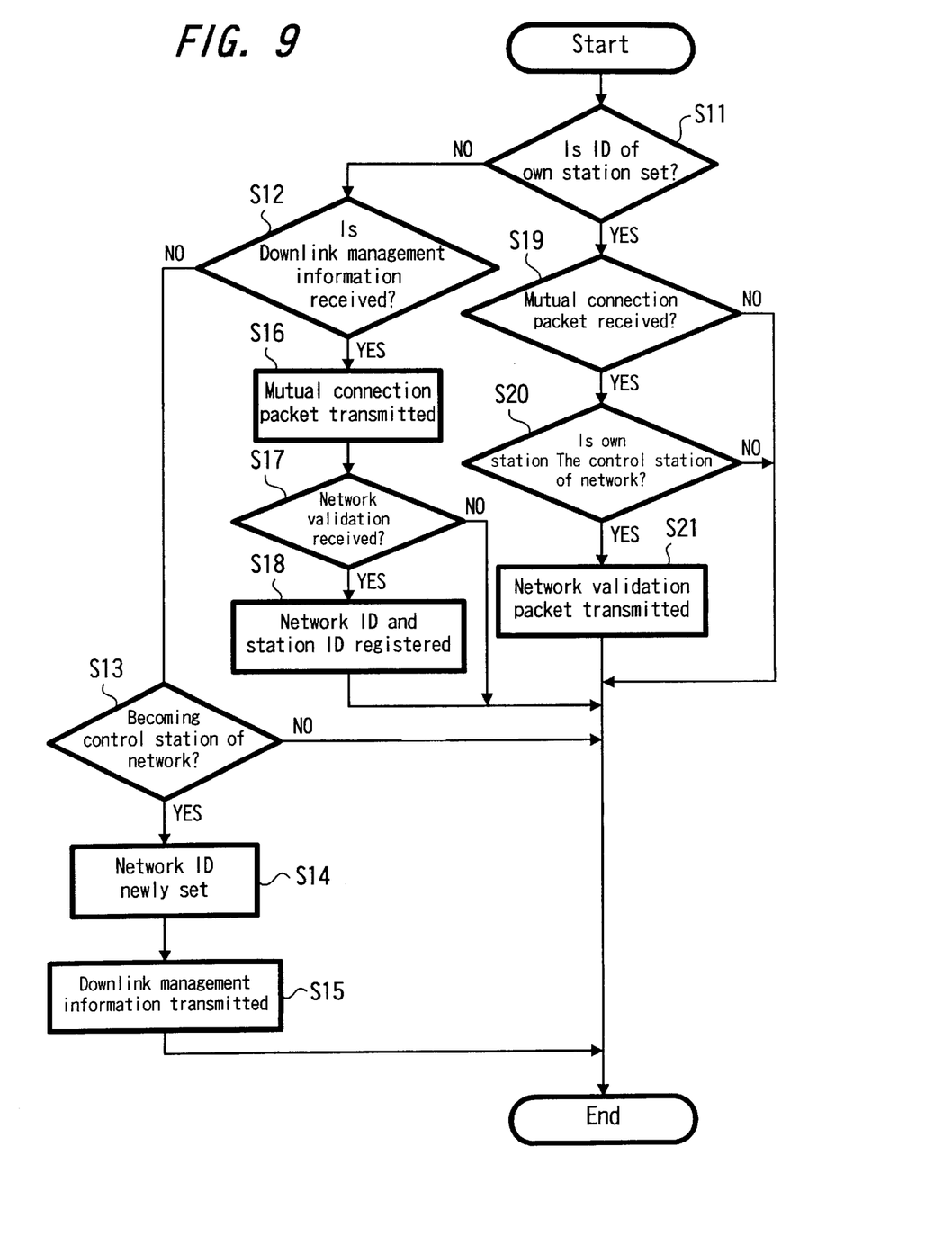
FIG. 9 is a flowchart showing the operation of mainly the control unit 45 of terminal communication stations 101 to 107 included in the wireless network system in the embodiment of the invention.

FIG. 9 is a flowchart mainly showing the operation of the control unit 45 of the terminal communication stations 101 to 107 included in the wireless network system in the embodiment of the invention.

Referring simultaneously to FIG. 1 to FIG. 8, the operation of the control unit of the terminal communication stations 101 to 107 is explained by using the flowchart in FIG. 9.

First, at step S11, it is checked whether the network ID is set in the wireless transmission equipment of the own station (any one of terminal communication stations 101 to 107). That is, it is judged if the network ID has been already set in the internal memory of the wireless transmission equipment of the own station. Herein, if it is judged that the network ID has not been set, it is judged whether or not the cycle start packet as the downlink management information has been received (step S12). If the downlink management information has not been received, it means there is no network around the own station, and hence the process goes to the step of setting the network.

That is, it is judged whether or not the own station may become the control station of the network system (step S13). For the purpose of this judgement, negotiation may be processed between the wireless transmission equipmentes of the own station and the partner station of mutual connection.

As a result of judgement, if the own station cannot be the control station, the process is terminated (as subsequent process, a network may be formed by belonging to the partner station of mutual connection). When the own station can be the control station, at step S14, a network ID is newly set, and a wireless network system is built up by setting the own station as the control station, and the downlink management information is transmitted by wireless means at step S15.

By judgement at step S12, when the downlink management information is received, a packet for mutual connection (packet in FIG. 6A) is transmitted (step S16), and it is judged whether or not a packet for network validation (packet in FIG. 6B) has been received (step S17). Herein, when the packet for network validation is received, the network ID and station ID are registered (step S18). That is, the corresponding network ID and station ID are stored in the internal memory of the wireless transmission equipment of the own station, and hereinafter the own station operates as a constituent element of the wireless network system. If the packet for network validation cannot be received at step S17, the process is terminated.

At step S11, if the network ID is set in the own station, it is judged whether or not a packet for mutual connection (packet in FIG. 6A) can be received (step S19), and it is checked whether or not the wireless transmission equipment of the own station (any one of terminal communication stations 101 to 107) is connected mutually to another station (any one of terminal communication stations 101 to 107 except for the own station). If the packet for mutual connection is received, it is judged whethe or not the own station is the control station of the network (step S20), and in the case of control station, a packet for network validation is transmitted (step S21). If the packet for mutual connection cannot be received at step S19, or when the own station is not judged to be the control station at step S20, the process is terminated.

When confirming mutual connection, for example, if the wireless transmission equipment are mutually connected by wired means, connection by external interface and cable is assumed. To be ready for the such case, a connection terminal exclusive for mutual connection may be provided. Or when the wireless transmission equipment are connected by wireless means, it is requited to specify a signal for recognizing the mutual connection state.

The validation operation of the network system is to acquire, for example, the station ID which is the unique information given to the wireless transmission equipment newly participating in the wireless network system.

Figure 10:
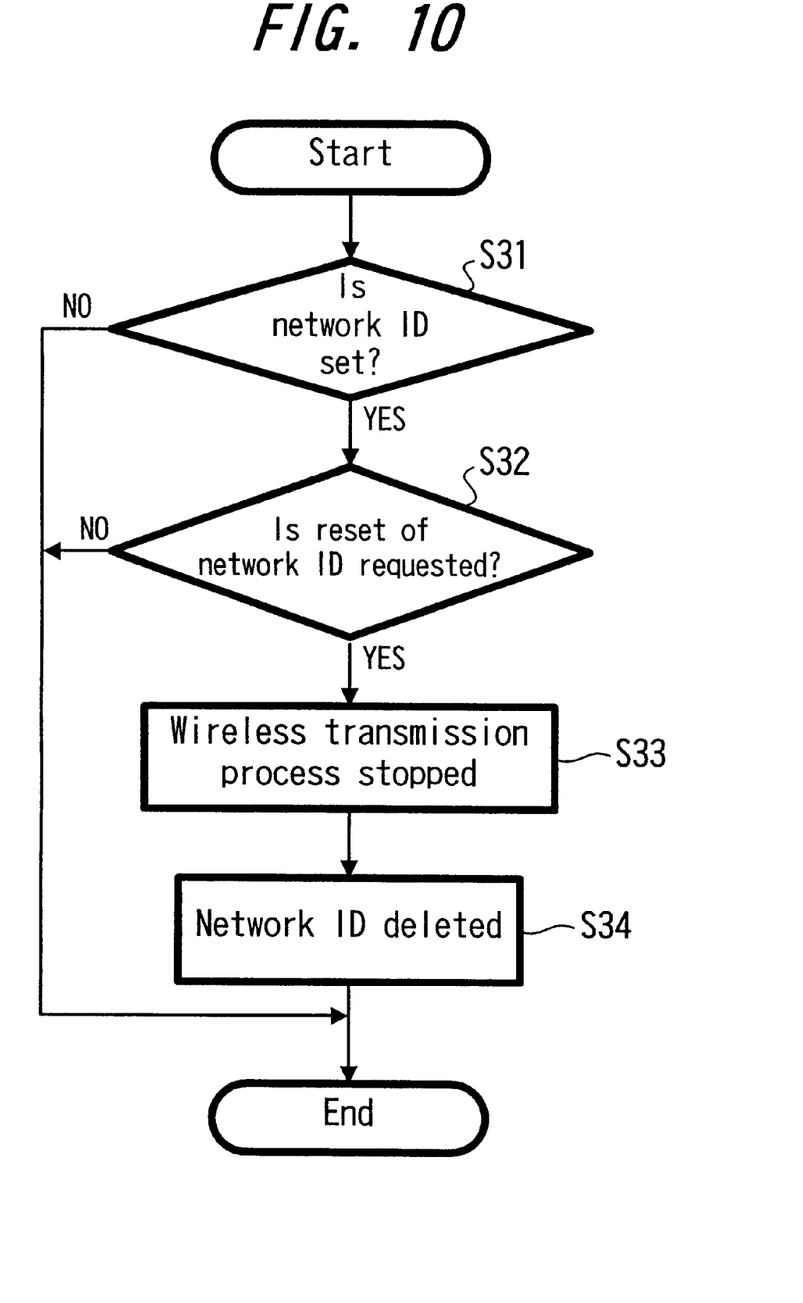
FIG. 10 is a flowchart showing the network resetting process.
Figure 11A:
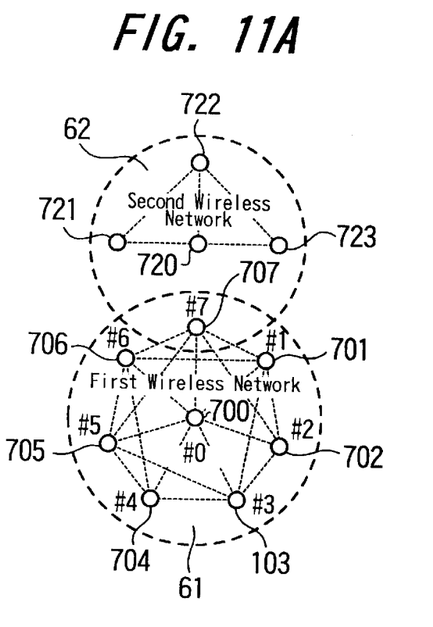
FIG. 11 is a schematic diagram showing procedure of connection of a wireless transmission equipment once belonging to one of the wireless network systems to another wireless network system in the embodiment of the invention.
Figure 11B:
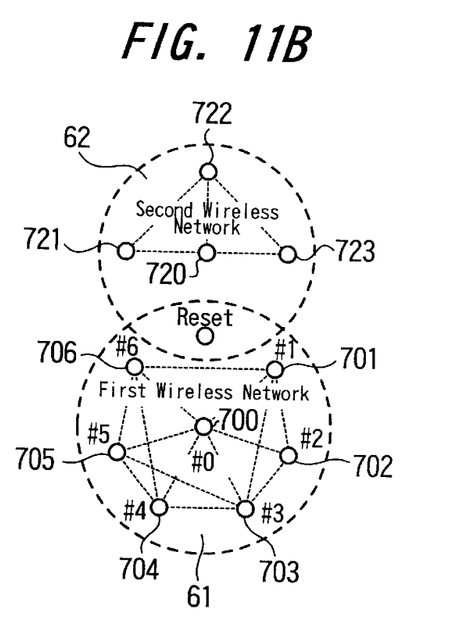
Figure 11C:
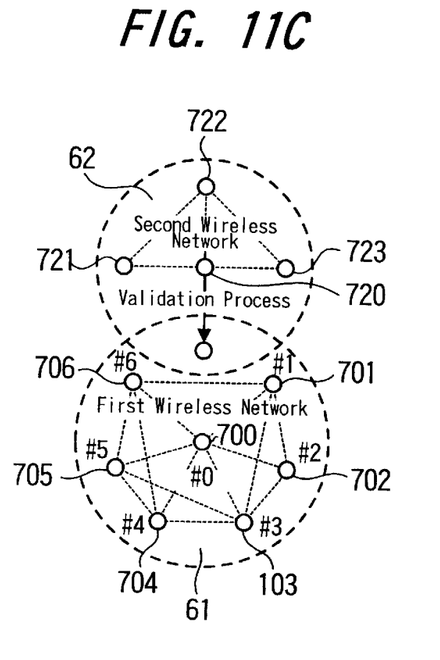
Figure 11D:
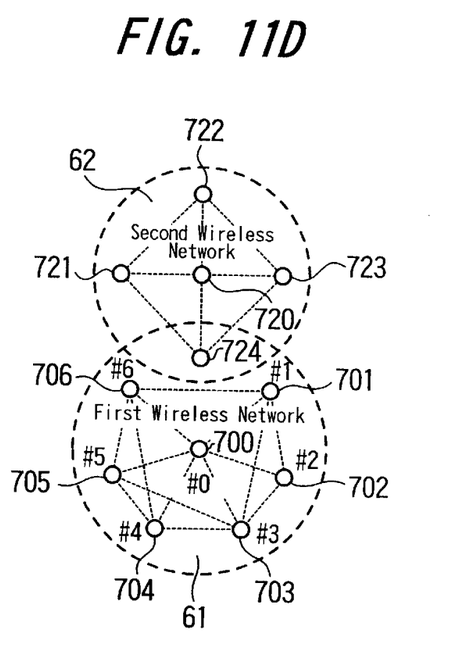

The network resetting process is shown in a flowchart in FIG. 10. First, as usual action of on-line operation after subscribing to the wireless network system, at step S912, it is judged if the network ID is set in the internal memory of the wireless transmission equipment of the own station (step S31). As a result of judgement, if the network ID is not set in the internal memory in the wireless transmission equipment of the own station, it is not validated as the wireless transmission equipment of wireless network system, and hence the process is terminated.

When the network ID is set, at step S32, it is judged whether or not the reset of the network ID of the own station is requested. For example, by installing a reset switch 48 as shown in FIG. 4 in the wireless transmission equipment, it may be designed to judge by its state.

Herein, if the reset of the network ID is not requested, the usual action continues. When judged at step S32, if the reset of the network ID is requested, at step S33, it is reported to the control station of the wireless network system that it is cut off from the wireless network system as required, and all wireless transmission is stopped, and at step S34, the management information such as the network ID information of the wireless network system is deleted from the internal memory of the wireless transmission equipment of the own station.

At each terminal communication station, checking for presence or absence of downlink management information transmitted from the control station of the wireless network system, the corresponding downlink management information is received, and only when the wireless network system is operating, the uplink management information is transmitted in response to the downlink management information.

If the wireless network system is not working, the uplink management information may not be transmitted.

By judgement at step S913, if the reset of the network ID is requested, at step S916, it is reported, as required, to the control station of the wireless network system that it is cut off from the wireless network system, and all wireless transmission is stopped, and at step S917, the management information such as network ID information of the wireless network system is deleted from the internal memory of the wireless transmission equipment of the own station.

In the case of wireless mutual connection, setting of network ID can be deleted by cutting off the power source of the wireless transmission equipment, or disabling reception of specified downlink management information transmitted from the control station for a specific period.

FIG. 10 is a schematic diagram showing a procedure of connection of wireless transmission equipment belonging to one of wireless network systems to another wireless network system according to the embodiment of the invention.

In the schematic diagram in FIG. 10(a), a first wireless network system 61 comprises terminal communication stations 701 to 707 surrounding a first control station 700, and a second wireless network system 62 comprises terminal communication stations 721 to 723 surrounding a second control station 720. The first wireless network system 61 and second wireless network system 62 are present adjacently to each another in space.

Herein, for the convenience of explanation, supposing the terminal communication station 707 composing the first wireless network system 61 is present at a position capable of communicating directly also with the control station of the second wireless network system, the terminal communication station 707 is assumed to be transferred from the first wireless network system 61 to the second wireless network system.

In the schematic diagram shown in FIG. 10(b), in order to cancel connection with the first wireless network system of the wireless transmission equipment of the terminal communication station 707 desired to be connected to another wireless network system, that is, the second wireless network system 62, for example, the reset switch belonging to the wireless transmission equipment of the terminal communication station 707 is pressed to cut off the terminal communication station 707 from the first network system 61.

By pressing the reset switch, hereinafter, the first wireless network system includes only the terminal communication stations 701 to 706 surrounding the first control station 700, and the wireless transmission equipment of the reset terminal communication station 707 is a wireless transmission equipment not connected to any wireless network system.

In the schematic diagram shown in FIG. 10(c), the terminal communication station 707 being cut off is newly participating in the second wireless network system 62.

Herein, in order that the wireless transmission equipment of the newly participating communication station may participate in the second wireless network system 62, it is mutually connected to the control station 720 of the second wireless network system 62, and the unique identification information of the second wireless network system 62 such as network ID is acquired.

In the schematic diagram shown in FIG. 10(d), changeover process accompanying new participation is over, and the newly participating communication station 724 (it is formerly terminal communication station 707) is composing the second wireless network system 62, together with the terminal communication stations 721 to 723 surrounding the second control station 720, as a new terminal communication station of the second wireless network system 62.

According to the invention as described herein, by the network ID unique to the corresponding wireless network system, a plurality of individually independent wireless network systems can be built up as being overlapped in space (using the same wireless network system).

A new wireless network system can be easily built up by mutually connecting a plurality of wireless transmission equipment not having registered network ID, and assigning each one of the plurality of wireless transmission equipment with the same new wireless network ID.

When extending an existing wireless network system, the wireless transmission equipment to be newly connected can automatically acquire the network ID unique to the wireless network system from the partner station of mutual connection.

An arbitrary wireless transmission equipment in the wireless network system can be used as the control station, and the validation information can be presented.

Further, only by deleting the network ID unique to the wireless network system being registered from the wireless transmission equipment as a constituent element of the wireless network system, the wireless transmission equipment can be automatically removed from the wireless network system. At this point, this wireless transmission equipment can be transferred to the constituent element of another wireless network system, so that the structure of the wireless network system can be designed and executed arbitrarily.

By registering the network ID unique to the corresponding wireless network system in the memory of the wireless transmission equipment, the wireless transmission equipment can be used as a constituent element of individually independent wireless network systems overlapped in space (using the same wireless network system).

Or by mutually connecting a plurality of wireless transmission equipment not registering wireless network ID, and registering a same new wireless network ID in each memory of the plurality of wireless transmission equipment, wireless transmission equipment capable of building up a new wireless network system easily can be presented.

By the means of registering the network ID unique to the wireless network system acquired automatically from the partner station of mutual connected, in the memory of a wireless transmission equipment to be connected newly, wireless transmission equipment capable of extending an existing wireless network system easily can be presented.

When used as arbitrary constituent elements in a wireless network system, wireless transmission equipment capable of becoming the control station for distributing validation information can be presented.

Further, only by eliminating the network ID unique to the wireless network system being registered, from the memory of the wireless transmission equipment already set as constituent element of wireless network system, the wireless transmission equipment can be automatically removed from the wireless network system. And at this moment this wireless transmission equipment can be transferred to a constituent element of another wireless network system, so that the wireless transmission equipment capable of designing the construction of the wireless network system freely can be presented.

What is claimed is:

1. A method of building a wireless network system using wireless transmission equipment comprising a mutual connection step of mutually connecting with another station or control station by exchanging first validation information including network ID (identification information unique to a wireless network system) specified in a wireless network system, a new participation step of newly participating in a wireless network system by receiving second validation information including the network ID, used when subscribing to the wireless network system corresponding to said network ID, a data input and output step of sending and receiving data together with management information including the network ID and a network ID updating step of registering or erasing the network ID, further comprising:

a step of mutually connecting with the wireless transmission equipment of another station or control station registering the network ID of the existing wireless network system, by executing the mutual connection step after setting the network ID of the wireless transmission equipment of the own station in non-registration state, and a step of registering the network ID in the wireless transmission equipment of the own station by receiving the second validation information from the wireless transmission equipment of another station or control station, characterized in that the wireless transmission equipment of the own station is subscribed in the existing wireless network system.

2. The method of building a wireless network system of claim 1, further comprising:

a step of mutually connecting with the wireless transmission equipment of another station of which network ID is in non-registration state, by executing the mutual connection step after setting the network ID of the wireless transmission equipment of the own station in non-registration state, and a step of transmitting the management information to the wireless transmission equipment of another station after newly setting the network ID of the new wireless network system as the own station becomes the control station, wherein the new wireless network system is built up, starting from the wireless transmission equipment of the own station.

3. The method of building a wireless network system of claim 1 or 2, further comprising:

a step of mutually connecting with the wireless transmission equipment of another station by executing the mutual connection step, and a step of transmitting the second validation information to the wireless transmission equipment of another station from the wireless transmission equipment of the own station, wherein the own station already subscribed in the existing wireless network becomes the control station having the wireless transmission equipment, and subscribes the wireless transmission equipment of another station of which network ID is in non registration state into the existing wireless network system.

4. The method of building a wireless network system of claim 3, further comprising:

a step of setting a reset request in the wireless transmission equipment of the own station, and a step of stopping wireless transmission of the wireless transmission equipment of the own station, wherein the wireless transmission equipment of the own station subscribed in the existing wireless network system is withdrawn from the existing wireless network system.

5. The method of building a wireless network system of claim 1, further comprising:

a step of setting a reset request in the wireless transmission equipment of the own station, and a step of stopping wireless transmission of the wireless transmission equipment of the own station, wherein the wireless transmission equipment of the own station subscribed in the existing wireless network system is withdrawn from the existing wireless network system.

6. The wireless transmission equipment of claim 1, further comprising:

means for erasing the network ID form the memory when not mutually connected to another station or control station by the mutual connection means, and the network ID is registered in the own station, and the reset request is set in the reset switch, and means of stopping wireless transmission of the own station.

7. A wireless transmission equipment comprising a wireless process unit, a data convert, unit for converting the data with management information including network ID (identification information unique to a wireless network system) for transmitting and receiving in the wireless process unit, an external device for sending and receiving data through the data convert unit and an interface, a control unit for controlling the operation of each part, and exchanging first validation information including the network ID used in mutual connection with the wireless transmission equipment of another station or control station, second validation information including the network ID used when subscribing to the wireless network system corresponding to the network ID and the management information, with the data convert unit, a memory for registering the network ID by the access from the control unit, and a reset switch for storing the command for erasing the network ID from the memory, further comprising:

mutually connection means for mutually connecting with another station or control station by exchanging the first validation information, means for registering the network ID in the memory, by receiving the second validation information from another station or control station by the network ID is not registered in the own station but is registered in another station or control station, with the own station being mutually connected to another station or control station by the mutual connection means, means for transmitting the management information including the newly set network ID to the wireless transmission equipment of another station after newly setting the unique network ID in a new wireless network system, when the own station is mutually connected to another station or control station by the mutually connection means, and the network ID is not registered either in the own station or in another station or control station, means for transmitting the second validation information to the wireless transmission equipment of another station from the wireless transmission equipment of the own station when the own station is the control station, if the own station is mutually connected to another station or control station by the mutual connection means, and the network ID is registered in the own station and is not registered in another station or control station, and means of receiving the management information when the management information is transmitted from the control station, and then returning the response to the received management information to the control station, when not mutually connected to another station or control station by the mutual connection means, and the network ID is registered in the own station, and the instruction of erasing the network ID from the memory (reset request) is not set in the reset switch.

* * * * *